United States Patent
Zheng

(10) Patent No.: US 10,528,845 B2
(45) Date of Patent: Jan. 7, 2020

(54) METHOD, DEVICE, AND STORAGE MEDIUM FOR GENERATING GIF FILE

(71) Applicant: TENCENT TECHNOLOGY (SHENZHEN) COMPANY LIMITED, Shenzhen (CN)

(72) Inventor: Yuyu Zheng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 108 days.

(21) Appl. No.: 15/843,523

(22) Filed: Dec. 15, 2017

(65) Prior Publication Data

US 2018/0107897 A1   Apr. 19, 2018

Related U.S. Application Data

(63) Continuation of application No. PCT/CN2016/097002, filed on Aug. 26, 2016.

(30) Foreign Application Priority Data

Sep. 24, 2015   (CN) .......................... 2015 1 0618807

(51) Int. Cl.
  *G06K 9/62*   (2006.01)
  *G06K 9/00*   (2006.01)
  *G11B 27/031*   (2006.01)

(52) U.S. Cl.
  CPC ....... *G06K 9/6215* (2013.01); *G06K 9/00362* (2013.01); *G06K 9/00624* (2013.01); *G11B 27/031* (2013.01)

(58) Field of Classification Search
  CPC ............. G06K 9/6215; G06K 9/00362; G06K 9/00624; G06F 16/583; G11B 27/007; G11B 27/031; G06T 17/00; G06T 2210/32
  See application file for complete search history.

(56) References Cited

U.S. PATENT DOCUMENTS

2007/0245027 A1   10/2007   Ghosh et al.
2016/0088326 A1*   3/2016   Solomon .............. H04N 21/254
                                                          725/12

FOREIGN PATENT DOCUMENTS

| CN | 102801942 A | 11/2012 |
| CN | 103718215 A | 4/2014 |
| CN | 103810738 A | 5/2014 |
| CN | 104318596 A | 1/2015 |
| CN | 104750737 A | 7/2015 |

(Continued)

OTHER PUBLICATIONS

Machine translation for CN 102801942, IDS (Year: 2012).*

(Continued)

*Primary Examiner* — Qian Yang
(74) *Attorney, Agent, or Firm* — Anova Law Group, PLLC

(57) ABSTRACT

Method, device, and storage medium for generating a GIF file. The method for generating a GIF file includes: obtaining an image set including a plurality of images; selecting at least two images from the image set, content of each of the at least two images satisfying a preset similarity condition, and a difference between photographing times of any two of the at least two images not exceeding a preset time threshold; and generating a GIF file according to the at least two images.

18 Claims, 5 Drawing Sheets

(56) References Cited

FOREIGN PATENT DOCUMENTS

JP            2003223648 A      8/2003

OTHER PUBLICATIONS

Machine translation for CN 103718215, IDS (Year: 2014).*
The State Intellectual Property Office of the People's Republic of China (SIPO) Office Action 1 for 201510618807.6 dated Mar. 13, 2019 10 Pages (including translation).
Jingtao, "Google Photos, which is not working properly in China, may be far more powerful than you think", Jun. 24, 2015 (Jun. 24, 2015), pp. 1-4, Retrieved from the Internet: URL: https://www.pingwest.com/a/52615. 25 Pages (including translation).
The World Intellectual Property Organization (WIPO) International Search Report for PCT/CN2016/097062 dated Dec. 14, 2016 5 Pages (including translation).

* cited by examiner

METHOD, DEVICE, AND STORAGE MEDIUM FOR GENERATING GIF FILE

RELATED APPLICATIONS

This application is a continuation application of PCT Patent Application No. PCT/CN2016/097002, filed on Aug. 26, 2016, which claims priority to Chinese Patent Application No. 201510618807.6, entitled "METHOD AND APPARATUS FOR GENERATING GIF FILE" filed with the Chinese Patent Office on Sep. 24, 2015, all of which is incorporated herein by reference in their entirety.

FIELD OF THE TECHNOLOGY

The present disclosure generally relates to the field of image processing, and in particular, relates to a method, device, and storage medium for generating a graphics interchange format (GIF) file.

BACKGROUND OF THE DISCLOSURE

A graphics interchange format (GIF) file provides a format for storing images. Images stored in a GIF file are read and displayed on a screen one after another in loop, so as to form a simple looped animation. Some image-based websites provide various GIF files stored on their servers for users to look up and view. Currently, a GIF file may be generated in the following manner. A user may use an application program for generating a GIF file by inputting images in the application program.

A GIF file may be played for a very short time, e.g., several seconds, which highly requires continuity between the images. Therefore, content of images that form the GIF file needs to be highly related. Usually, only one or two objects may move in a playing image of the GIF file, and the scene in the images remains the same.

When an application program is used to combine multiple images to form a GIF file, a user may input an image much different from an adjacent image. Consequently, when playing the images in the GIF file, non-related images may be played continuously and a jump in content between adjacent images may occur.

SUMMARY

One aspect of present disclosure provides a method for generating a graphics interchange format (GIF) file, including obtaining an image set including a plurality of images; selecting at least two images from the image set, content of each of the at least two images satisfying a preset similarity condition, and a difference between photographing times of any two of the at least two images not exceeding a preset time threshold; and generating a GIF file according to the at least two images.

Another aspect of present disclosure provides a device, including a memory, storing program instructions for a method for generating a graphics interchange format (GIF) file, and a processor, coupled to the memory and, when executing the program instructions, configured for: obtaining an image set, including a plurality of images; selecting at least two images from the image set, content of each of the at least two images satisfying a preset similarity condition, and a difference between photographing times of any two of the at least two images not exceeding a preset time threshold; and generating a GIF file according to the at least two images.

Another aspect of present disclosure provides a non-transitory computer-readable storage medium containing computer-executable program instructions for, when executed by a processor, performing a method for generating a graphics interchange format (GIF) file, the method including: obtaining an image set, including a plurality of images; selecting at least two images from the image set, content of each of the at least two images satisfying a preset similarity condition, and a difference between photographing times of any two of the at least two images not exceeding a preset time threshold; and generating a GIF file according to the at least two images.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person skilled in the art may still derive other drawings from these accompanying drawings without creative efforts.

DESCRIPTION OF EMBODIMENTS

To make the objectives, technical solutions, and advantages of the present disclosure clearer, the following further describes implementation manners of the present disclosure in detail with reference to the accompanying drawings.

When a number of images of a user are taken in various poses and scenes, it is often desirable to generate a graphics interchange format (GIF) file from these images. A GIF file is a looped video file, which allows the user to browse or play back those images and reminisce about the photographing scene at that moment.

The present disclosure provides a method, device, and storage medium for generating a GIF file. The present disclosure solves technical problems that: a user has to select related images from a number of images for generating a GIF file, and/or images in a GIF file may be played in discontinued order for scenes and/or objects. According to embodiments of the present disclosure, there is no need for users to select related images from a number of images for generating a GIF file, and images in a generated GIF file are played in a continuous order for scenes and/or objects in the images.

Figure 1:
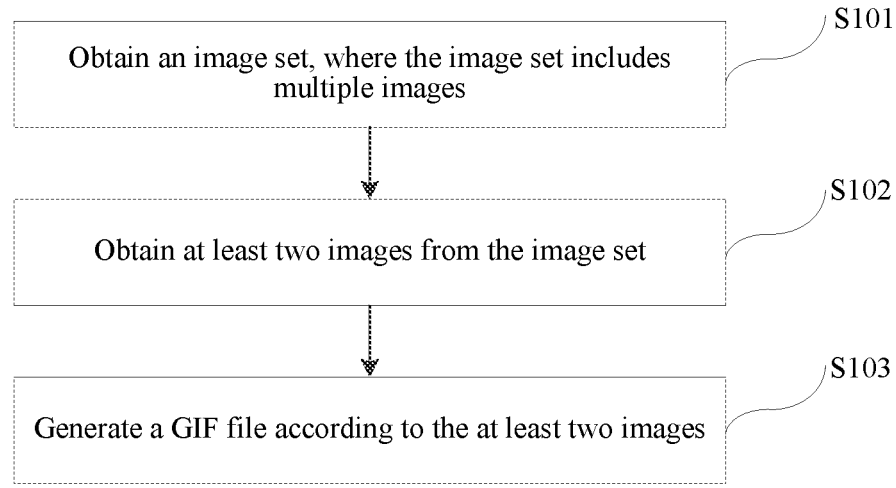
FIG. 1 is a flowchart of an exemplary method for generating a GIF file according to some embodiments of the present disclosure.

FIG. 1 is a flowchart of an exemplary method for generating a GIF file according to some embodiments of the present disclosure.

In S101: Obtaining an image set, the image set including a plurality of images.

In S102: Obtaining at least two images from the image set, where content of each of the at least two images satisfies a preset similarity condition, and a difference between photographing times of any two of the at least two images does not exceed a preset time threshold.

In S103: Generating a GIF file according to the at least two images.

As such, at least two images are selected from an image set, where content of each of the at least two images satisfies a preset similarity condition, and a difference between photographing times of any two of the at least two images does not exceed a preset time threshold; and a GIF file is generated according to the at least two selected images.

In this manner, images are "automatically" selected from an image set, a user no longer needs to select an image. Operation costs are reduced and efficiency of generating a GIF file is improved. In addition, because a difference between photographing times of any two of at least two images does not exceed a preset time threshold and images photographed in a same scene are selected, a degree of similarity between images used for generating a GIF file is increased. Therefore, contents of images in the generated GIF file are highly related and continuous. Jumps in content between adjacent images are reduced.

Figure 2:
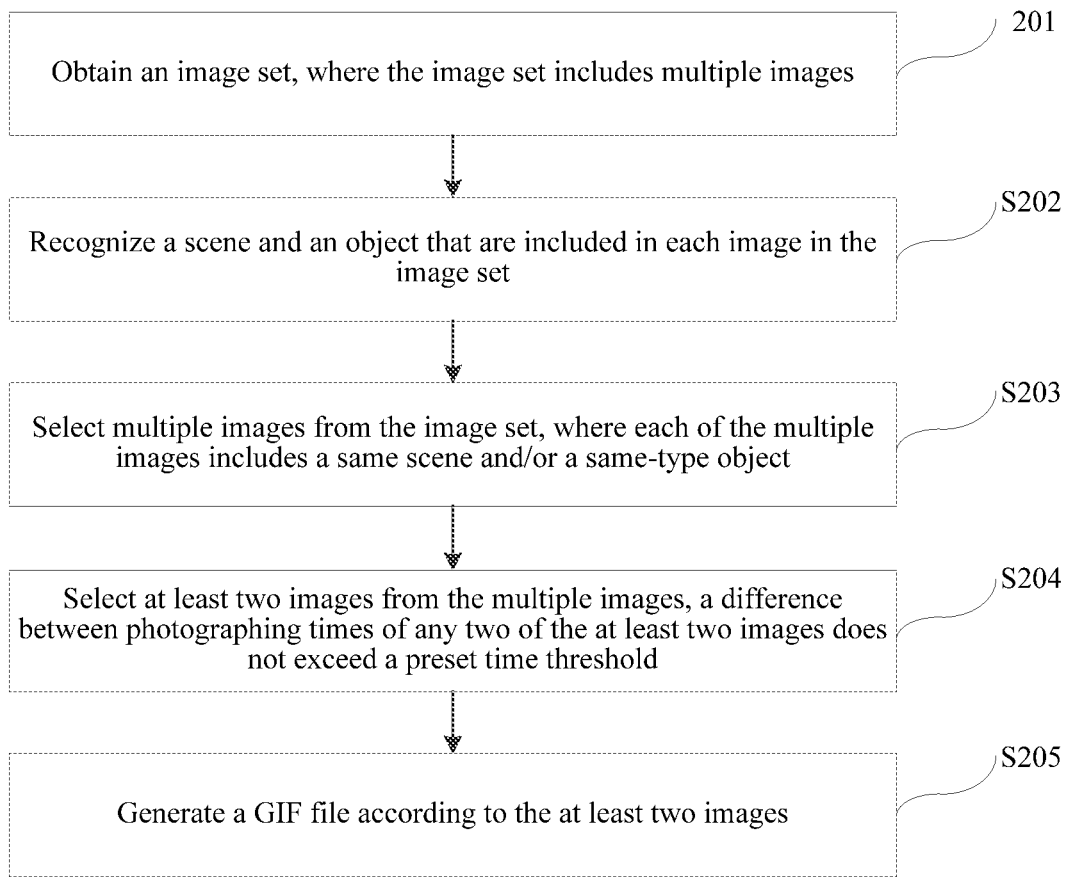
FIG. 2 is a flowchart of another exemplary method for generating a GIF file according to some embodiments of the present disclosure.

FIG. 2 is a flowchart of another exemplary method for generating a GIF file according to some embodiments of the present disclosure.

In S201: Obtaining an image set, the image set including a plurality of images.

For example, a plurality of images stored in a photographing device may be obtained, and the obtained images are combined to obtain an image set. Alternatively, a plurality of images uploaded by a user may be obtained, and the plurality of images may be combined to obtain an image set.

In various embodiments, a photographing device, a terminal other than the photographing device, a server, or the like, may be used for generating a GIF file.

In one embodiment, when performed by a terminal other than the photographing device, the terminal may be, for example, a PC, a tablet computer, or a mobile phone, and a user may connect the photographing device to the terminal. Then, after the terminal is connected to the photographing device, the terminal obtains an image stored in the photographing device from the photographing device.

In another embodiment, when performed by a server, the user may upload a plurality of images that are photographed by the user using the photographing device, to the server. Correspondingly, the server receives the images uploaded by the user.

In another embodiment, when performed by the photographing device, the photographing device obtains the plurality of images stored in the photographing device. In this case, the photographing device may be a camera, a video camera, a mobile phone having a photographing function, a tablet computer, and/or the like.

Each image in the image set has an attribute of a photographing time. The photographing time may be stored in an attribute field of the image. The photographing time stored in the attribute field may be as follows: A current time may be obtained when an image is photographed by the photographing device, and the current time is used as the photographing time of the image and is stored in the attribute field of the image.

Further, any suitable method may be used for obtaining an image set. For example, a plurality of images that are selected by the user from a local image folder on a terminal are obtained, and the plurality of images are combined to obtain an image set. The images stored in the local image folder on the terminal may be images drawn by the user by using a drawing tool, images photographed by the user, images captured by the user by using a screen-shot tool, and/or the like.

An attribute field of an image drawn by the user by using a drawing tool also stores a photographing time. The photographing time may be a time when the user finishes drawing the image. The drawing tool obtains a current time when the user finishes drawing an image, and uses the current time as a photographing time of the image, and saves the photographing time in an attribute field of the image. Optionally, when the drawing tool detects that the user saves an image, the drawing tool determines that the user finishes drawing the image, and uses a current time as a photographing time of the image.

Similarly, an attribute field of an image captured by the user by using a screen-shot tool also stores a photographing time. The photographing time may be a time when the user captures the image. The screen-shot tool obtains a current time when the user captures an image, uses the current time as a photographing time of the image, and saves the photographing time in an attribute field of the image.

In various embodiments, at least two images are needed to generate a GIF file, that is, an image set includes a plurality of images. A user may be notified if only one image is obtained, so that the user selects or uploads images again or continues to select or upload an image. For example, prompt information may be displayed to notify the user. For example, the displayed prompt information may be: "Failed to generate a GIF file. Please select two or more images!".

In S202: Recognizing a scene and an object that are included in each image in the image set.

For example, object types included in a first image are recognized. The first image is any image in the image set. It is determined whether a preset object type exists in the object types included in the first image. When the preset object type exists in the object types included in the first image, an object corresponding to the preset object type in the first image is recognized, and a scene included in the first image is recognized.

The preset object type may be a person or an animal, or may further be another object type that is in a moving state, for example, a car or a box that is in a moving state. Both a person and an animal are movable objects.

Because content of images that form a GIF file has relatively high relevance and usually only one or two objects move in a playing image of the GIF file, an object corresponding to the preset object type in the image needs to be recognized.

In this exemplary step, the scene and the object in the first image may be recognized by using a content recognition technology. The scene in the first image may be represented by using a color of one or more color regions having the largest area in the first image. For example, when a user photographs an image on a grass, a color region having the largest area in the image may be a blue sky or the grass. The scene in the image may be represented by using sky blue or grass green. Alternatively, the scene in the first image may be represented by a building or the like in the first image. For example, when the user photographs an image in front of a building such as the Eiffel Tower, the Egyptian Pyramids or the Statue of Liberty, the scene in the image may be represented by the building such as the Eiffel Tower, the Egyptian Pyramids or the Statue of Liberty.

Figure 3:
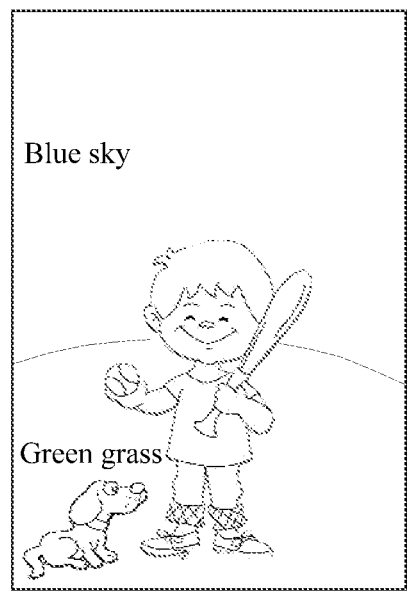
FIG. 3 is a schematic diagram of an exemplary image according to some embodiments of the present disclosure.

Optionally, an operation of recognizing a scene in each image may be: using colors of the first N (N is a preset number) color regions having relatively large areas as the scene in the image. For example, FIG. 3 shows an image. Content of the image describes that Xiao Ming is playing on a green grass under a blue sky, and a photographing time is Sep. 1, 2015, 9:10. It is assumed that N is 2. Because the blue sky and the green grass are the two color regions having the largest areas in the image, sky blue and grass green of the two largest areas may be used as the scene in the image shown in FIG. 3.

Figure 4:
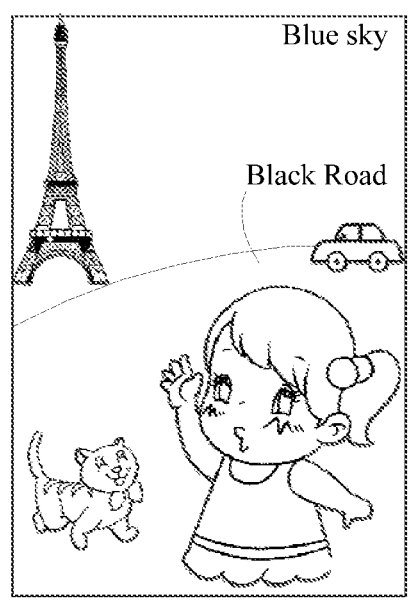
FIG. 4 is a schematic diagram of another exemplary image according to some embodiments of the present disclosure.
Figure 5:
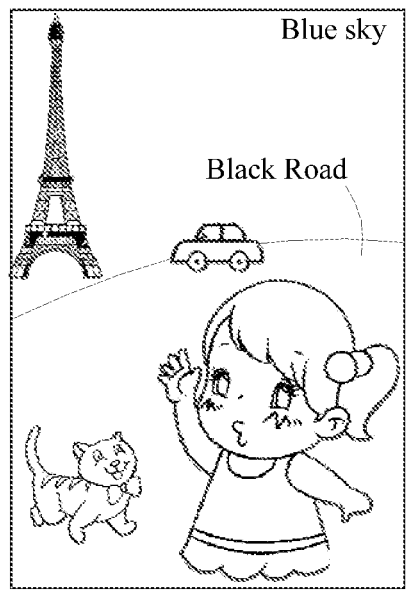
FIG. 5 is a schematic diagram of another exemplary image according to some embodiments of the present disclosure.
Figure 6:
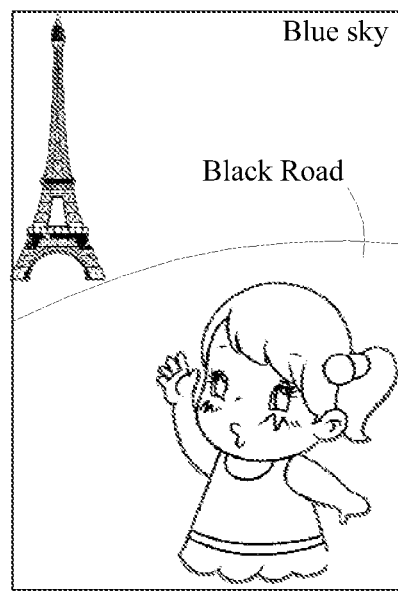
FIG. 6 is a schematic diagram of another exemplary image according to some embodiments of the present disclosure.

In addition, the scene further includes a building that does not occupy a large color region but has a special form. For example, FIG. 4 shows an image. Content of the image describes Xiao Li in front of the Eiffel Tower, and a photographing time is Aug. 10, 2015, 15:10. Although an area of a color region occupied by the Eiffel Tower is not large, the Eiffel Tower may alternatively be used as the scene in the image shown in FIG. 4 because of a special readily recognizable form of the Eiffel Tower. Content of images in FIG. 5 and FIG. 6 also describes Xiao Li in front of the Eiffel Tower. FIG. 4, FIG. 5, and FIG. 6 are images photographed at different times. It is assumed that the photographing times of FIG. 5 and FIG. 6 are respectively Aug. 10, 2015, 15:15 and Aug. 10, 2015, 15:18. The Eiffel Tower may alternatively be used as the scene in FIG. 5 and FIG. 6. In addition, colors of the two color regions having the largest areas are in FIG. 4, FIG. 5, and FIG. 6 are sky blue and the black color of road. Therefore, the scene in FIG. 4, FIG. 5, and FIG. 6 may be represented by blue and black, or may be jointly represented by blue, black, and the Eiffel Tower.

During recognition of the scene in each image, colors of the first N color regions having relatively large areas are used as the scene in the image, so that the scene can be recognized relatively rapidly, a recognition speed is increased, and efficiency of generating a GIF file is further improved. Alternatively, a building in the image is used as the scene in the image, so that the scene can be conveniently recognized, thereby improving recognition accuracy, increasing recognition speed, and further improving efficiency of generating a GIF file.

Optionally, during recognition of an object in each image, it can be recognized whether each object is a person or an animal, and in addition, a representative feature such as hair length, a face shape or a body shape of the person can further be recognized, or it can be further recognized whether the animal is specifically a cat, a dog, a goose, or the like. An object of another type, especially, an object whose position is changing can further be recognized. For example, a short-haired thin person and a dog in FIG. 3 can be recognized, and a long-haired fat person and a cat in FIG. 4 can be recognized. Alternatively, FIG. 4 and FIG. 5 show two images that are photographed in a same scene. A photographing time of FIG. 5 is Aug. 10, 2015, 15:15, and a photographing time of FIG. 4 is Aug. 10, 2015, 15:10. The photographing time of FIG. 5 is subsequent to the photographing time of FIG. 4. During recognition of objects in FIG. 4 and FIG. 5, it can be recognized that the position of the car in FIG. 5 is changed relative to that in FIG. 4.

It should also be noted that the representative feature of a person not only includes the hair length, the face shape or the body shape, and may further include the colors and types of clothes, but is not limited thereto. After it is recognized that the animal is specifically a cat, a dog, a goose or the like, a breed of the animal can further be recognized. For example, when it is recognized that the animal is a dog, a breed such as a husky or a poodle of the dog can further be recognized.

Next, this exemplary step is described in detail by using a specific example. For example, it is assumed that in this exemplary embodiment, the obtained image set includes the four images shown in FIG. 3, FIG. 4, FIG. 5, and FIG. 6. For the image shown in FIG. 3, it is recognized by using an image recognition technology that the scene in the image shown in FIG. 3 is blue and green and the objects are a person and an animal. For the images shown in FIG. 4, FIG. 5, and FIG. 6, it is recognized by using the image recognition technology that the scenes in the images shown in FIG. 4 and FIG. 5 are blue, black, and the Eiffel Tower and that the objects are persons and animals. In addition, it may further be recognized that the images shown in FIG. 4, FIG. 5, and FIG. 6 have a car whose relative position changes.

During recognition of the object in each image, a representative feature of a person is specifically recognized and a specific breed of an animal is recognized, so that selection precision can be improved in a subsequent step of selecting images having similar content.

In S203: Selecting a plurality of images from the image set according to the scene and the object that are included in each image, where each of the plurality of images includes at least one of a same scene and a same-type object.

Optionally, in this exemplary step, the plurality of images may further be selected from the image set according to the scene and the object that are included in each image, where each of the plurality of images includes a same scene and a same object.

For example, according to a scene and an object included in each image shown in FIG. 3, FIG. 4, FIG. 5, and FIG. 6, an image is selected from the images shown in FIG. 3, FIG. 4, FIG. 5, and FIG. 6. Because a scene in an image is represented by a color of one or more color regions having the largest area in the image, N is used for representing a quantity of color regions, and N is an integer greater than or equal to 1.

During selection of an image, if N=1, that is, a color of only one color region having a relatively large area is used as a scene in the image. Because the scenes in the four images shown in FIG. 3, FIG. 4, FIG. 5, and FIG. 6 may all be represented by sky blue, and the types of the objects included in the four images are all persons and animals, the four images have a same scene and include objects of same object types. During selection of an image, the four images in FIG. 3, FIG. 4, FIG. 5, and FIG. 6 can be selected.

If N=2, that is, colors of the first two color regions having relatively large areas are used as the scene in the image. In this way, the scene in FIG. 3 is represented by blue and green. The scenes in FIG. 4, FIG. 5, and FIG. 6 are represented by blue and black. Because the scenes in the three images shown in FIG. 4, FIG. 5, and FIG. 6 are all blue and black, and the types of the objects included in the three images are all persons and animals. Therefore, the three images have a same scene and include objects of same object types. During selection of an image, the three images in FIG. 4, FIG. 5, and FIG. 6 can be selected.

A plurality of images of a same object are selected, so that a degree of relevance among the multiple selected images can be improved, so that images included in a GIF file are similar and precision of the generated GIF file is improved.

In addition, because a playing image of the generated GIF file changes dynamically, during selection of the plurality of images, selection of two identical images further need to be avoided.

In S204: Selecting at least two images from the plurality of images according to a photographing time of each of the plurality of images, where a difference between photographing times of any two of the at least two images does not exceed a preset time threshold.

For example, the multiple selected images further include, in addition to the images shown in FIG. 3, FIG. 4, FIG. 5, and FIG. 6, five images C, D, E, F, and G. Photographing times of the five images C, D, E, F, and G are respectively: Aug. 10, 2015, 14:00; Aug. 10, 2015, 13:00; Aug. 10, 2015, 9:00; Jul. 10, 2015, 10:40; and Aug. 9, 2015, 16:30. That is, the nine images are selected when performing the exemplary step 203.

If the preset time threshold is about 20 minutes, the images shown in FIG. 4 (Aug. 10, 2015, 15:10), FIG. 5 (Aug. 10, 2015, 15:15), and FIG. 6 (Aug. 10, 2015, 15:18) should be selected. In this way, FIG. 3 and images C, D, E, F, and G that apparently do not have a same scene as that in FIG. 4, FIG. 5, and FIG. 6 are excluded by using the method of the preset time threshold.

If the preset time threshold is about 60 minutes, the images shown in FIG. 4 (Aug. 10, 2015, 15:10), FIG. 5 (Aug. 10, 2015, 15:15), FIG. 6 (Aug. 10, 2015, 15:18), and FIG. C (Aug. 10, 2015, 14:00) should be selected.

Optionally, a minimum time interval may further be set. The minimum time interval limits that an interval between photographing times of any two of selected images needs to be greater than the minimum time interval. For example, the minimum time interval is one second, two seconds, three seconds or the like. In this way, selection of two identical images may be avoided.

Because a difference between photographing times of any two of the at least two selected images does not exceed the preset time threshold, a difference between photographing times of any two of the multiple selected images in step 203 is greater than the preset time threshold. That is, if an image that satisfies a requirement cannot be selected from the plurality of images, the user may be notified, so that the user resets the preset time threshold. For example, prompt information may be displayed to notify the user. For example, the displayed prompt information may be "Failed to generate a GIF file. Please set a larger preset time threshold!".

A difference between photographing times of any two images does not exceed the preset time threshold. During selection of similar images, within a time of the preset time threshold, photographed images are basically images photographed by a user in a same scene. Therefore, when a plurality of images are selected, where a difference between photographing times of any two of the plurality of images does not exceed the preset time threshold, the plurality of images have relatively high relevance. In this way, a formed GIF file has relatively high precision. Therefore, contents of images in the generated GIF file are highly related and continuous. Jumps in content between adjacent images are reduced.

In S205: Generating a GIF file according to the at least two images.

Optionally, during generation of a GIF file, the GIF file may be generated by using the two images in chronological order of the photographing times, or in reverse chronological order of the photographing times, or in an image order specified by the user. A beneficial effect of such processing is: The chronological order or reverse chronological order can help the user to reminisce about the photographing. The image order specified by the user can enable the user to insert text descriptions or drawings, thereby facilitating customization by the user.

In an exemplary embodiment, after the GIF file is generated by using the at least two images, the GIF file may further be converted into a video file of a video format, and the video file is sent to the server. A beneficial effect of such processing is that the generated GIF file may be shared with others on a social platform.

It should also be noted that the order of performing step 203 and step 204 may be altered.

As such, a scene and an object that are included in each image are recognized, and at least two images that include at least one of a same scene and a same-type object are selected from an image set, where a difference between photographing times of any two of the at least two images does not exceed a preset time threshold.

In this manner, images are "automatically" selected from an image set, a user no longer needs to select an image. Operation costs are reduced and efficiency of generating a GIF file is improved. In addition, because each of the at least two selected images includes at least one of a same scene and a same-type object, and a difference between photographing times of any two of the at least two images does not exceed a preset time threshold, the two selected images are images that are photographed by a user in the same scene, so that a degree of similarity between images used for generating a GIF file is increased. Therefore, contents of images in the generated GIF file are highly related and continuous. Jumps in content between adjacent images are reduced. When an image that satisfies a requirement cannot be selected, a notification is sent to the user, so that it is convenient for the user to understand the reason of failing to generate a GIF file and to successfully generate a GIF file a next time.

Figure 7:
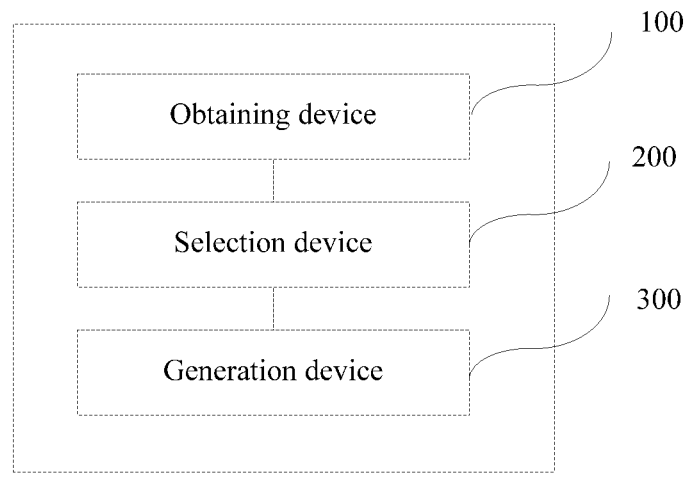
FIG. 7 is a schematic structural diagram of an exemplary apparatus for generating a GIF file according to some embodiments of the present disclosure.

FIG. 7 is a schematic structural diagram of an exemplary apparatus for generating a GIF file according to some embodiments of the present disclosure. The apparatus for generating a GIF file includes:

an obtaining device 100, configured to obtain an image set, where the image set includes a plurality of images;

a selection device 200, configured to select at least two images from the image set, where each of the at least two images includes at least one of a same scene and a same-type object, and a difference between photographing times of any two of the at least two images does not exceed a preset time threshold; and a generation device 300, configured to generate a GIF file according to the at least two images.

Figure 8:
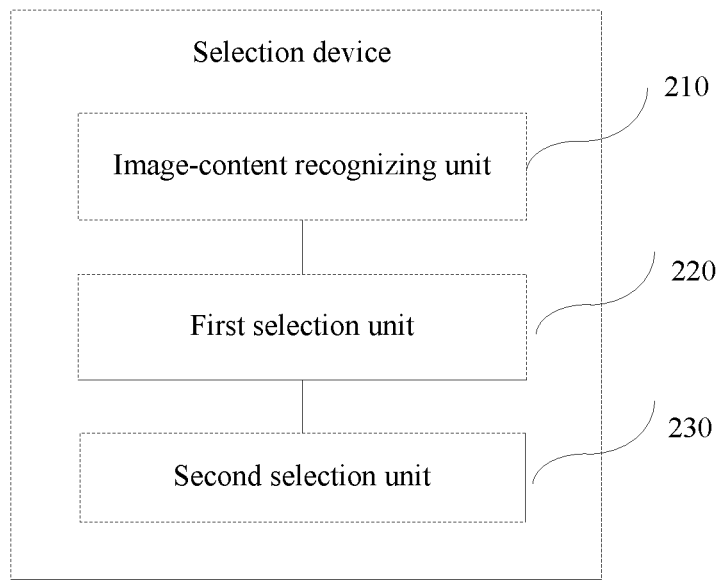
FIG. 8 is a schematic structural diagram of an exemplary selection device in an apparatus for generating a GIF file according to some embodiments of the present disclosure.

Optionally, as shown in FIG. 8, the selection device 200 includes:

a image-content recognizing unit 210, configured to recognize a scene and an object that are included in each image in the image set;

a first selection unit 220, configured to select a plurality of images from the image set according to the scene and the object that are included in each image, where each of the plurality of images includes at least one of a same scene and a same-type object; and a second selection unit 230, configured to select at least two images from the plurality of images according to a photographing time of each of the plurality of images, where a difference between photographing times of any two of the at least two images does not exceed the preset time threshold.

Figure 9:
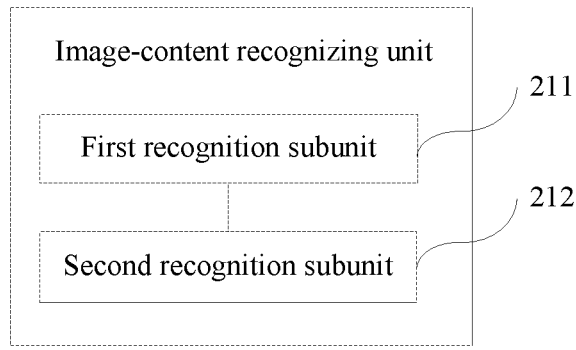
FIG. 9 is a schematic structural diagram of an exemplary image-content recognizing unit of an apparatus for generating a GIF file according to some embodiments of the present disclosure.

Optionally, as shown in FIG. 9, the image-content recognizing unit 210 includes:

a first recognition subunit 211, configured to recognize object types included in a first image, where the first image is any image in the image set; and a second recognition subunit 212, configured to: if a preset object type exists in the object types included in the first image, recognize an object corresponding to the preset object type in the first image, and recognize a scene included in the first image.

The preset object type recognized by the first recognition subunit 211 includes at least one of a person or an animal.

The first selection unit 220 selects a plurality of images having a same scene and/or a same-type object from the image set.

The images in the image set are images photographed by a same photographing device or images uploaded by a same user.

Optionally, the apparatus for generating a GIF file further includes:

a conversion module 400, configured to: convert the GIF file that is generated by using the at least two images into a video file of a video format, and send the video file to a server.

As such, an obtaining module obtains an image set; a selection module selects at least two images from the image set, where each of the at least two images includes at least one of a same scene and a same-type object, and a difference between photographing times of any two of the at least two images does not exceed a preset time threshold; and a GIF file is generated according to the at least two images by using a generation module.

In this manner, images are "automatically" selected from an image set, a user no longer needs to select an image. Operation costs are reduced and efficiency of generating a GIF file is improved. In addition, In addition, because each of the at least two selected images includes at least one of a same scene and a same-type object, and a difference between photographing times of any two of the at least two images does not exceed a preset time threshold, a degree of similarity between images used for generating a GIF file is increased. Therefore, contents of images in the generated GIF file are highly related and continuous. Jumps in content between adjacent images are reduced.

Figure 10:
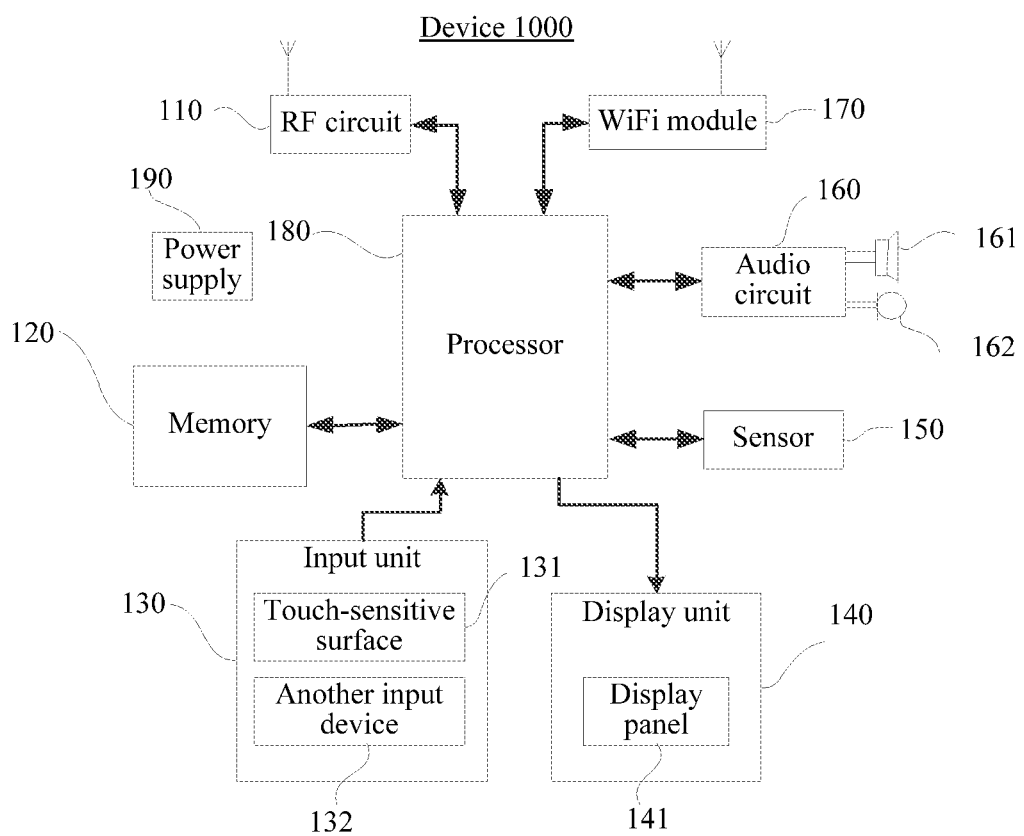
FIG. 10 is a schematic structural diagram of an exemplary device according to some embodiments of the present disclosure.

FIG. 10 is a schematic structural diagram of an exemplary device according to some embodiments of the present disclosure. The device may be configured to implement the method for generating a GIF file as disclosed herein.

The device 1000 may include components such as a radio frequency (RF) circuit 110, a memory 120 including one or more computer readable storage media, an input unit 130, a display unit 140, a sensor 150, an audio circuit 160, a wireless fidelity (WiFi) module 170, a processor 180 including one or more processing cores, and a power supply 190. A person skilled in the art may understand that the structure of the device shown in FIG. 10 does not constitute a limitation to the device, and the device may include more components or fewer components than those shown in the figure, or some components may be combined, or a different component deployment may be used.

The RF circuit 110 may be configured to receive and send signals during an information receiving and sending process or a call process. Particularly, the RF circuit 110 receives downlink information from a base station, then delivers the downlink information to the processor 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image play function), and the like. The data storage area may store data (such as audio data and an address book) created according to use of the device 1000, and the like. In addition, the memory 120 may include a high speed random access memory (RAM), and may also include a non-volatile memory, such as at least one magnetic disk storage device, a flash memory, or another volatile solid-state storage device. Correspondingly, the memory 120 may further include a memory controller, so as to provide access of the processor 180 and the input unit 130 to the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touch screen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch signal from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the device 1000. The graphical user interfaces may be formed by a graph, a text, an icon, a video, or any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 10, the touch-sensitive surface 131 and the display panel 141 are used as two separate parts to implement input and output functions, in some embodiments, the touch-sensitive surface 131 and the display panel 141 may be integrated to implement the input and output functions.

The device 1000 may further include at least one sensor 150, such as an optical sensor, a motion sensor, or other sensors. Specifically, the optical sensor may include an ambient light sensor and a proximity sensor. The ambient light sensor can adjust luminance of the display panel 141 according to brightness of the ambient light. The proximity sensor may switch off the display panel 141 and/or backlight when the device 1000 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the device 1000, are not further described herein.

The audio circuit 160, a loudspeaker 161, and a microphone 162 may provide audio interfaces between the user and the device 1000. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal device by using the RF circuit 110, or outputs the audio data to the memory 120 for further processing. The audio circuit 160 may further include an earplug jack, so as to provide communication between a peripheral earphone and the device 1000.

WiFi is a short distance wireless transmission technology. The device 1000 may help, by using the WiFi module 170, the user to receive and send e-mails, browse a webpage, access streaming media, and so on, which provides wireless broadband Internet access for the user. Although FIG. 10 shows the WiFi module 170, it may be understood that the WiFi module 170 is not a necessary component of the device 1000, and when required, the WiFi module 170 may be omitted as long as the scope of the essence of the present disclosure is not changed.

The processor 180 is the control center of the device 1000, and is connected to various parts of the mobile phone by using various interfaces and lines. By running or executing the software program and/or module stored in the memory 120, and invoking data stored in the memory 120, the processor 180 performs various functions and data processing of the device 1000, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that the foregoing modem may also not be integrated into the processor 180.

The device 1000 further includes the power supply 190 (such as a battery) for supplying power to the components. Preferably, the power supply may be logically connected to the processor 180 by using a power management system, thereby implementing functions such as charging, discharging and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the device 1000 may further include a camera, a Bluetooth module, and the like, which are not further described herein. Specifically, in this exemplary embodiment, the display unit of the device 1000 is a touch screen display, and the device 1000 further includes a memory and one or more programs. The one or more programs are stored in the memory and configured to be executed by one or more processors. The one or more programs contain instructions used for performing the following operations:

obtaining an image set, where the image set includes a plurality of images;

selecting at least two images from the image set, where each of the at least two images includes at least one of a same scene and a same-type object, and a difference between photographing times of any two of the at least two images does not exceed a preset time threshold; and generating a GIF file according to the at least two images.

Optionally, the obtaining at least two images from the image set includes:

recognizing a scene and an object that are included in each image in the image set;

selecting a plurality of images from the image set according to the scene and the object that are included in each image, where each of the plurality of images includes at least one of a same scene and a same-type object; and selecting at least two images from the plurality of images according to a photographing time of each of the plurality of images, where a difference between photographing times of any two of the at least two images does not exceed the preset time threshold.

Optionally, the recognizing a scene and an object that are included in each image in the image set includes:

recognizing object types included in a first image, where the first image is any image in the image set; and if a preset object type exists in the object types included in the first image, recognizing an object corresponding to the preset object type in the first image, and recognizing a scene included in the first image.

Optionally, the preset object type includes at least one of a person or an animal.

Optionally, the selecting a plurality of images from the image set according to the scene and the object that are included in each image includes:

selecting, from the image set according to the scene and the object that are included in each image, a plurality of images having a same scene and/or a same object.

Optionally, the images in the image set are images photographed by a same photographing device or images uploaded by a same user.

Optionally, after the generating a GIF file according to the at least two images, the method further includes:

converting the GIF file into a video file of a video format, and sending the video file to a server.

In this exemplary embodiment of the present disclosure, at least two images are selected from an image set, where each of the at least two images includes at least one of a same scene and a same-type object, and a difference between photographing times of any two of the at least two images does not exceed a preset time threshold; and a GIF file is generated according to the at least two selected images.

In this manner, images are "automatically" selected from an image set, a user no longer needs to select an image. Operation costs are reduced and efficiency of generating a GIF file is improved. In addition, because each of the at least two selected images includes at least one of a same scene and a same-type object, and a difference between photographing times of any two of the at least two images does not exceed a preset time threshold, a degree of similarity between images used for generating a GIF file is increased. Therefore, contents of images in the generated GIF file are highly related and continuous. Jumps in content between adjacent images are reduced.

In an exemplary embodiment, a non-transitory computer readable storage medium including instructions, for example, a memory including program instructions, is further provided. The instructions may be executed by a processor in a terminal to implement the foregoing method for generating a GIF file. For example, the non-transitory computer readable storage medium may be a ROM, a RAM, a CD-ROM, a magnetic tape, a floppy disk, or an optical data storage device, and the like.

A person of ordinary skill in the art may understand that all or some of the steps of the foregoing embodiments may be implemented through hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for generating a graphics interchange format (GIF) file, comprising:
   obtaining an image set, comprising a plurality of images;
   selecting image-one and image-two from the image set, wherein the image-one includes a largest image area of a first color and the image-two includes a largest image area of a second color same to the first color, and wherein the image-one is of a first photographing time stamp and the image-two is of a second photographing time stamp within a preset time stamp threshold from the first photographing time stamp; and
   generating a GIF file according to the image-one and image-two.

2. The method according to claim 1, wherein the image-one and image-two in the image set are photographed by a same photographing device or are uploaded by a same user.

3. The method according to claim 1, further comprising:
   converting the GIF file into a video file of a video format; and
   sending the video file to a server.

4. The method according to claim 1, wherein the image-one is selected to include a second largest area of a third color, the image-two is selected to include a second largest image area of a fourth color same to the third color.

5. The method according to claim 1, further comprising:
   resetting the preset time threshold to obtain a reset time threshold; and
   selecting image-three from the image set, the image-three being of a third photographing time stamp, wherein at least one of the first and second photographing time stamps is within the reset time threshold from the third photographing time stamp.

6. The method according to claim 1, further comprising:
   obtaining image-three from the plurality of images, wherein the image-one includes a first object, the image-two includes a second object, and the image-three includes a third object, and wherein the third object is same to at least one of the first object and the second object; and
   generating the GIF file further according to the image-three.

7. A device, comprising: a memory, storing program instructions for a method for generating a graphics interchange format (GIF) file, and a processor, coupled to the memory and, when executing the program instructions, configured for:
   obtaining an image set, comprising a plurality of images;
   selecting image-one and image-two from the image set, wherein the image-one includes a largest image area of a first color and the image-two includes a largest image area of a second color same to the first color, and wherein the image-one is of a first photographing time stamp and the image-two is of a second photographing time stamp within a preset time stamp threshold from the first photographing time stamp; and
   generating a GIF file according to the image-one and image-two.

8. The device according to claim 7, wherein the image-one and image-two in the image set are photographed by a same photographing device or are uploaded by a same user.

9. The device according to claim 7, wherein the processor is further configured for:
   converting the GIF file into a video file of a video format; and
   sending the video file to a server.

10. The device according to claim 7, wherein the image-one is selected to include a second largest area of a third color, the image-two is selected to include a second largest image area of a fourth color same to the third color.

11. The device according to claim 7, wherein the processor is further configured for:
   resetting the preset time threshold to obtain a reset time threshold; and selecting image-three from the image set, the image-three being of a third photographing time stamp, wherein at least one of the first and second photographing time stamps is within the reset time threshold from the third photographing time stamp.

12. The device according to claim 7, wherein the processor is further configured for:
   obtaining image-three from the plurality of images, wherein the image-one includes a first object, the image-two includes a second object, and the image-three includes a third object, and wherein the third object is same to at least one of the first object and the second object; and
   generating the GIF file further according to the image-three.

13. A non-transitory computer-readable storage medium containing computer-executable program instructions for, when executed by a processor, performing a method for generating a graphics interchange format (GIF) file, the method comprising:
   obtaining an image set, comprising a plurality of images;
   selecting image-one and image-two from the image set, wherein the image-one includes a largest image area of a first color and the image-two includes a largest image area of a second color same to the first color, and wherein the image-one is of a first photographing time stamp and the image-two is of a second photographing time stamp within a preset time stamp threshold from the first photographing time stamp; and
   generating a GIF file according to the image-one and image-two.

14. The storage medium according to claim 13, wherein the image-one and image-two in the image set are photographed by a same photographing device or are uploaded by a same user.

15. The storage medium according to claim 13, wherein the method further comprises:
   converting the GIF file into a video file of a video format; and
   sending the video file to a server.

16. The storage medium according to claim 13, wherein the image-one is selected to include a second largest area of a third color, the image-two is selected to include a second largest image area of a fourth color same to the third color.

17. The storage medium according to claim 13, wherein the method further comprises:
   resetting the preset time threshold to obtain a reset time threshold; and
   selecting image-three from the image set, the image-three being of a third photographing time stamp, wherein at least one of the first and second photographing time stamps is within the reset time threshold from the third photographing time stamp.

18. The storage medium according to claim 13, wherein the method further comprises:
   obtaining image-three from the plurality of images, wherein the image-one includes a first object, the image-two includes a second object, and the image-three includes a third object, and wherein the third object is same to at least one of the first object and the second object; and
   generating the GIF file further according to the image-three.

* * * * *